Figure 6:
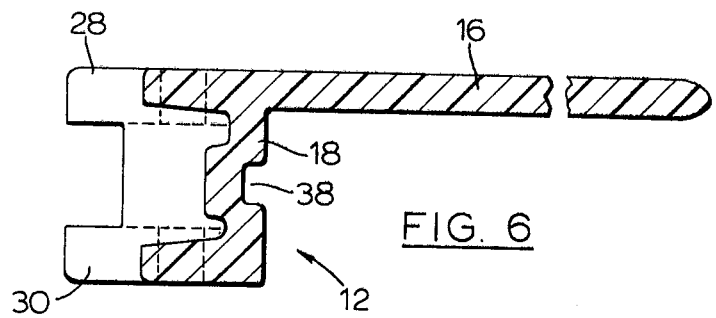

United States Patent
Brackmann et al.

[15] 3,659,697
[45] May 2, 1972

[54] CONVEYOR LINK

[72] Inventors: Warren A. Brackmann, Cooksville, Ontario; Daniel DiIanni, Toronto, Ontario, both of Canada

[73] Assignee: Rothmans of Pall Mall Canada Limited, Toronto, Ontario, Canada

[22] Filed: Apr. 14, 1970

[21] Appl. No.: 28,303

[30] Foreign Application Priority Data

Sept. 30, 1969   Great Britain......................48,090/69

[52] U.S. Cl.............................................198/136, 198/189
[51] Int. Cl.......................................................B65g 15/00
[58] Field of Search..........................198/136, 189, 171, 181

[56] References Cited

UNITED STATES PATENTS

| | | |
|---|---|---|
| 1,424,850 | 8/1922 | Purcell..................................198/189 |
| 1,769,992 | 7/1930 | Furbush.................................198/189 |

FOREIGN PATENTS OR APPLICATIONS

| | | |
|---|---|---|
| 150,781 | 10/1950 | Australia..............................198/181 |

Primary Examiner—Richard E. Aegerter
Assistant Examiner—Douglas D. Watts
Attorney—Sim & McBurney

[57] ABSTRACT

A rigid link for a conveyor chain includes a rigid platform to support a load and means to pivotally connect links to each other to form a chain and for pivotal movement about an axis substantially perpendicular to the plane of the platform. Means is provided to one side of the platform to coact with other like parts of like links when the links are joined together to form a chain to space the platforms of the links apart from each other when the chain is formed into a helix. A conveyor chain capable of formation into a self-supporting helix is provided from a plurality of such links articulated together.

9 Claims, 7 Drawing Figures

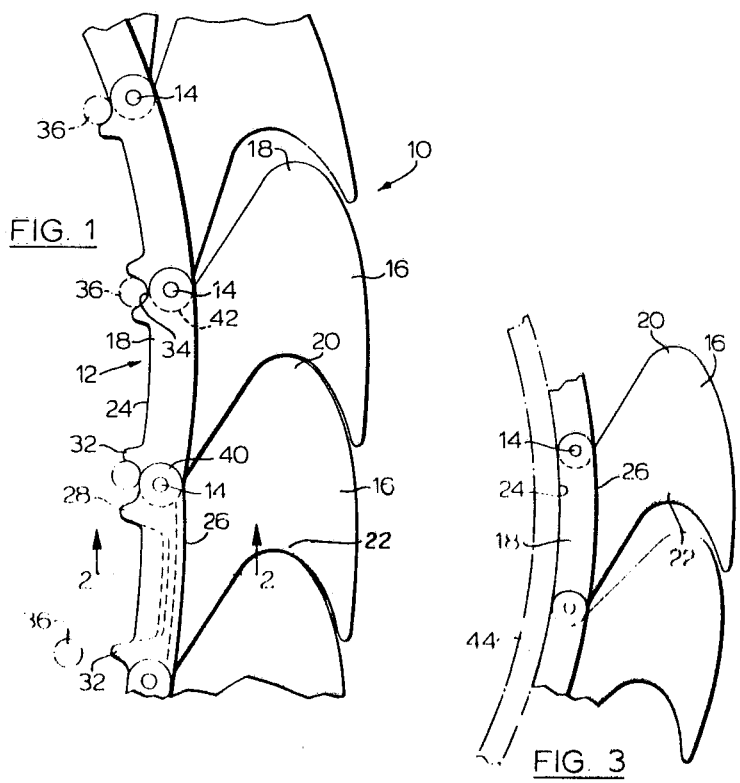
FIG. 1
FIG. 3
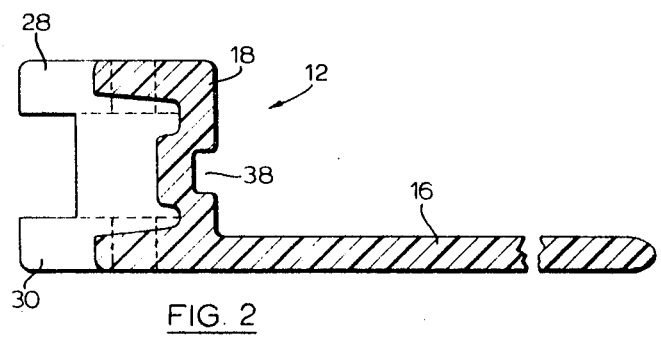
FIG. 2
INVENTOR.
WARREN A. BRACKMANN
DANIEL DiIANNI
BY
Attorney

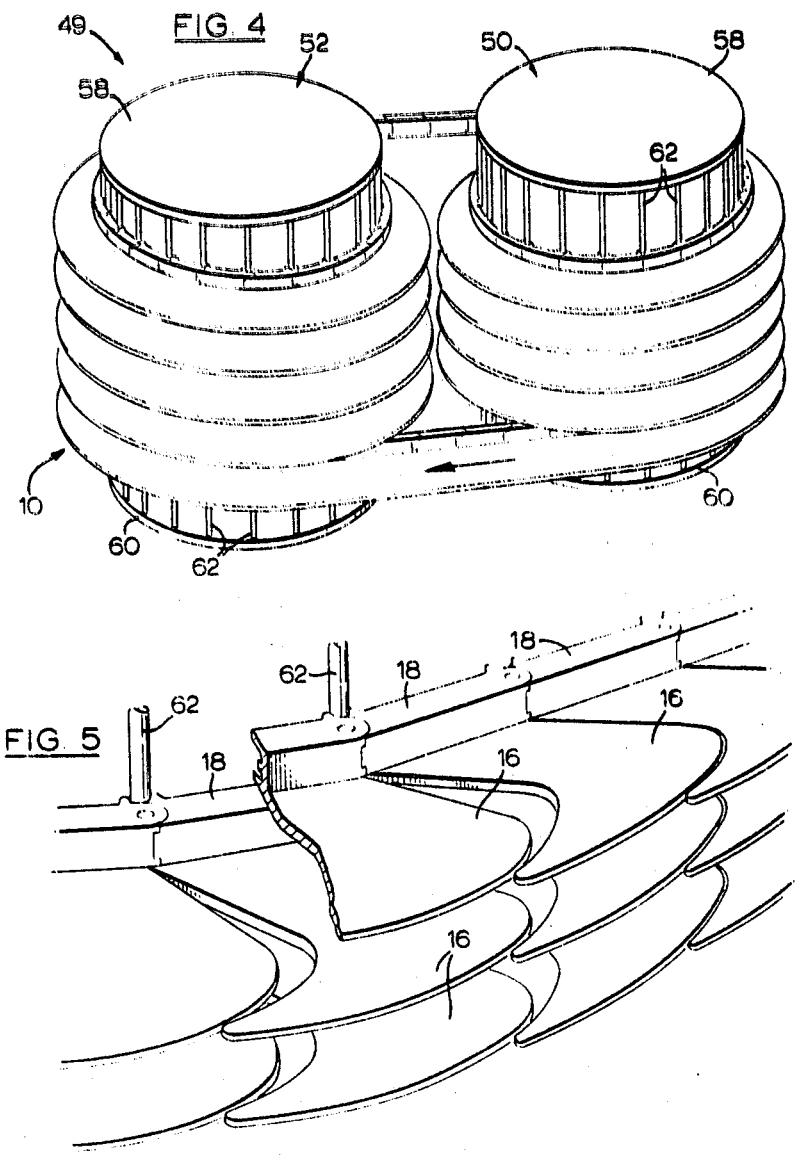

CONVEYOR LINK

This invention relates to conveyor chains and links for the chains.

Platform-type conveyor chains are known. Such chains include a plurality of articulated links, each link having a platform and a support portion located underneath said platform and about the midpoint of the lateral width of the platform. Pivot pins associated with such support portions serve to pivotally connect adjacent links to each other about an axis parallel to the plane of the platform and transverse of the chain. Drive is imparted to such chain through the support portions.

This known type of platform or "flat-top" conveyor chain is widely used in bottling and food processing plants for the mass transportation of cans, jars, bottles and similar containers to and from the various stations at which they are sterilized, filled, closed, sealed, etc., and also finds wide application in conveying various articles and packages in other industries. Exemplary of such conveyor chains are those described in U.S. Pat. Nos. 1,966,659 issued July 17, 1934 to R. J. Wynne et al.; 2,564,533 issued Aug. 14, 1951 to P. J. Imse; and 2,911,091 issued Nov. 3, 1959 to P. J. Imse.

Where stations are provided at vertically spaced locations, articles transported by the known type of platform conveyor, referred to above, generally have to be conveyed in other manners through the vertical height separating the stations. Thus, if the station to which the articles are to be transported is located at a lower level from the station delivering the articles to the conveyor chain, then a chute could be provided. Such a gravity operated device could lead to damage to the articles concerned.

Conveyors have been proposed including chains capable of being driven in a curvilinear path while in a substantially horizontal plane. Such chains are driven by a curved surface, such as an upright drum. Generally, two such drums are provided in horizontally spaced arrangement and an endless chain is arranged about the drums in helices. Such conveyor chains require a supporting track on which the chain runs. Such track may be in fixed location external of the drums.

This type of conveyor is used to provide a long length of endless conveyor in a relatively small space. In freezing, cooling or heating rooms a relatively long conveyor may retain articles to be brought to a requisite temperature in a single conveying cycle. They are also used as high capacity storage conveyors adjoining assembly lines. Exemplary of such systems is that described in Canadian Pat. No. 786,662 issued June 4, 1968 to Ashworth Brothers, Inc.

While this drum-driven conveyor is capable of readily moving articles through vertical heights without substantial damage to the articles, and is able to provide a long length of endless conveyor in a relatively small space, it does suffer from the disadvantage that a supporting track is required. Since the chain used generally is constructed of metal, this has lead to a high noise level and wear to both the track and the chain. In addition, the necessity for a track leads to construction problems and bulky equipment.

The chain described in Canadian Pat. No. 786,662 does not have a smooth, low friction, load-bearing surface of the platform type. This may lead to limitations in the use of this type of chain. A flat surface could be simulated by providing a platform associated with each individual link of the chain but such a construction would be costly to manufacture and would not provide a wholly satisfactory load supporting surface.

In accordance with the present invention, a platform conveyor chain is provided which is capable of movement both in curvilinear and rectilinear paths and when is formed into a helix is self-supporting throughout its height. The present invention also provides individual links for the chain.

The chain of the invention may be used in a conveyor of the type described and claimed in copending application Ser. No. 27957 filed Apr. 13, 1970.

The invention will now be described by way of example with reference to the accompanying drawings:

FIG. 1 is a top elevational view of one part of a platform conveyor chain;
FIG. 2 is a cross-section along line 2—2 of FIG. 1;
FIG. 3 is a top elevational view of a part of another platform conveyor chain;
FIG. 4 is a perspective view of a conveyor incorporating the chain of FIG. 1,
FIG. 5 is a detail of FIG. 4,
FIG. 6 is a cross-sectional view of an alternative form of the link of FIG. 2, and
FIG. 7 is a cross-sectional view of a further alternative form of the link of FIG. 2.

A chain 10 consists of a plurality of substantially identical links 12 (only three of which are shown) articulated to each other through pivot pins 14. Each individual link 12 includes a platform 16 and an elongated support or body part 18 at one side of the platform. The support part 18 is illustrated projecting wholly above the plane of the platform 16. This represents a preferred embodiment.

Figure 7:
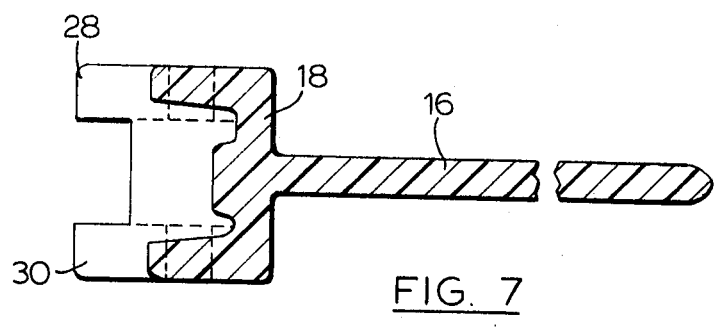

The support part 18 may project wholly below the plane of the platform 16 as illustrated in FIG. 6 where like reference numerals are employed to designate like parts or partly above and partly below the plane as illustrated in FIG. 7 where like reference numerals are employed to designate like parts.

The support part 18 acts to support the platform 16 in cantilever manner when the chain is in operation as will become apparent hereinafter in the description of FIG. 4. The support part 18 also acts to space from each other the platforms of vertically adjacent links when the chain is formed into a helix as will be more specifically described below with reference to FIG. 5.

The pivot pins 14 articulate the links 12 for pivotal movement about an axis substantially perpendicular to the plane of the platform 16. Other means to achieve such pivotal movement could be provided.

The platform 16 is provided with a particular shape defined by a curved periphery. The curved periphery defines a convex outline 20 at the leading edge of the platform when the chain is in motion and a concave outline 22 at the trailing edge of the platform. The convex and concave outlines are of substantially complimentary shape. The platform 16 is shaped to provide a substantially continuous surface when the chain 10 moves in a rectilinear path and a minimum gap only between platforms of adjacent links when the chain 10 moves in a curvilinear path. The leading and trailing edges may be bevelled to allow articles supported on the surface of the platform 16 to slide smoothly over the surface.

The shape of the platform 16 is not critical. A rectangular shape could be tolerated under certain circumstances but it is preferred to avoid a gap at the outboard area of adjacent links when the chain is moving in a curvilinear path. A series of projecting fingers and complimentarily shaped indentations could be provided, for example.

The support part 18 is formed with curved sides 24 and 26. Side 24 has upper and lower protrusions or teeth 28 and 30 (see FIG. 2) formed integral therewith adjacent one end of the support part 18, and has similar upper and lower protrusions; only one, 32, of which is shown, formed integral therewith adjacent the other end.

The protrusions 28 and 30 are shaped to cooperate with the nearer pair of the adjacent forward link to form a channel or recess 34 in which may be received a movable member. The movable member may impart motion to the chain or may be moved by the chain if the latter has motion imparted to it. The movable member may be a vertical bar 36. The protrusions at the other end of the link are similarly shaped to cooperate with the nearer pair of the adjacent rearward link to form a similar channel or recess.

As can be seen in FIG. 1 in this embodiment when the chain moves in a rectilinear path, the bar 36 is not engaged by both sets of protrusions, but when the chain moves in a curvilinear path, the bar is gripped by both sets of protrusions. Such a combination of gripping protrusion and movable member constitutes a novel drive.

The shape of the protrusions may be varied from that illustrated. They may be formed so that on assuming the curvilinear path the protrusions surround and enclose the bar. The upper and lower protrusions may be replaced by a single contiguous protrusion extending the height of the support part.

In addition to the construction shown in FIGS. 1 and 2, a positive drive to the chain may be provided by constructing a driving surface having a plurality of spaced-apart protrusions. Such protrusions may be received in recesses formed on the links. Such recesses may be formed in the support portion 18. Alternatively, the cooperating protrusions may be formed on a single link.

The side 26 of the support part 18 is formed with an elongated channel 38 therein. The reason for the presence of this channel will become apparent hereinafter. The support part 18 is illustrated hollowed out to reduce the weight of the chain. Such hollowing-out may be omitted.

Each support part 18 has semicircular ends 40 and 42. The end 40 is formed with a horizontal slot therein to receive a tongue formed at the end of an adjacent link. A pivot pin 14 passes through the end 40 and the tongue to articulate the adjacent links. The end 42 is in the form of a tongue which is received within the horizontal slot of the adjacent link. A pivot pin 14 completes the articulation. While pivot pins have been described to articulate the links, other means are possible.

The tongue and slot usually are so constructed that there is a small degree of slack in the joint, whereby the chain may be readily formed into a helix. Different manners of providing the slack may be used, depending on the manner of formation of the articulation.

Each link 12 may be integrally molded from synthetic polymeric material. Alternatively, the support part 18 and the platform 16 may be separately molded and subsequently formed into one-piece structure. It is preferred to use a synthetic polymeric material to form the links, since in this way a desirable combination of lightness and strength is achieved. The particular synthetic polymeric material employed will depend on the intended use of the chain. Nylon and acetal resins such as "Delrin" (trademark) are suitable materials, and other thermoplastic and thermosetting resins may be used.

Turning now to the embodiment illustrated in FIG. 3, this embodiment is similar to that of FIGS. 1 and 2 and the same reference numerals have been employed to describe like parts. The difference between these embodiments is the omission of protrusions from the support part 18. The side 24 is concavely curved and contacts a curved driving surface 44 when the chain moves in a curvilinear path. It is preferred both that the side 24 have a continuous surface and that the radii of curvature of the driving surface 44 and of the side 24 be substantially the same so that maximum surface-to-surface contact between the curved driving surface 44 and the side 24 is achieved. The driving surface 44 drives the chain 10 by frictional engagement between the surface 44 and the side 24.

The chain may be driven in a rectilinear or curvilinear path. When the chain moves in the curvilinear path, the links articulate about a substantially vertical axis. This is in contrast to the prior art platform-type conveyors wherein the links articulate about a substantially horizontal axis.

In FIGS. 4 and 5 there is illustrated a conveyor system incorporating the chain of FIG. 1. The conveyor system 49 includes a pair of upright horizontally spaced drums or cylinders 50 and 52, rotatable about vertical axes. The chain 10 is formed into a helix curving downwardly about drum 50, and into a helix curving upwardly about drum 52. Rectilinear portions of the chain 10 join the two helices to form a continuous chain conveyor system. A stationary cam surface (not shown) associated with the drum 50 serves to urge the chain into a downwardly spiralling helix and a stationary cam surface (not shown) associated with the drum 52 serves to urge the chain into an upwardly spiralling helix. Such cam surfaces generally are constructed of low friction material, such as "Teflon" (trademark), to maintain the friction between these surfaces and the chain at a low level.

As can be more readily seen in FIG. 5, each spiral of chain is sandwiched between the next upper and next lower spiral, except at the run-on and run-off points. The chain is self-supporting throughout its height and no auxiliary support for the platforms of the links is provided. These vertical forces clamp the support part 18 and the platform 16 is cantilevered from the support part 18.

The platform 16 is illustrated perpendicular to both the support portion 18 and to the helices. The platform may be sloped upwardly from the horizontal and outwardly of the support portion. Such a construction aids in retaining objects on the chain.

The support part 18 serves to space apart platforms of adjacent spirals. The vertical height of part 18 is determined by the space required between the platforms, which in turn is determined by the size of the articles conveyed.

Each of drums 50 and 52 is constructed in the form of an open cage with top and bottom members 58 and 60. The top and bottom members 58 and 60 are connected by a series of vertical bars 62 positioned around the periphery of the drum at circumferentially spaced locations. Each of the bars 62 is circular in cross-section and may be constructed of high carbon steel or similar material. The bars 62 are received within the recesses defined by the protrusions on adjacent links (see FIG. 1).

Driving means, such as an electric motor with suitable gearing, (not shown), may be provided to drive one or both of the drums 50 and 52. Where only one of the drums is driven, then that drum imparts drive to the chain 10 which in turn drives the other drum. When the drums are in motion, the cooperating protrusions slide up the bars.

In addition to the vertical forces sustaining the helix, tension is provided in the system to maintain the helices in contact with the drums. The support part 18 therefore may be subjected to both vertical and horizontal forces to provide the necessary support for the cantilevered platform.

The rectilinear portions of the chain 10 joining the two helices about the two drums 50 and 52 are supported in channels (not shown). In these channels, the support parts 18 are subjected to vertical forces to provide the necessary support for the cantilevered platform.

The conveyor system illustrated in FIGS. 4 and 5 may be modified so as to employ the chain of FIG. 3. The open cage structure drums 50 and 52 are replaced by drums having a continuous surface. Such surface is provided with friction pads or the like to provide frictional engagement between the drums and the chain. The chain is subjected to tension to provide good frictional engagement. Both drums are normally driven in this arrangement so that both surfaces drive the chain.

The chain of the present invention may be utilized in a variety of other conveying systems including rectilinear motion, curvilinear motion, or both. The chain may be used to convey articles from one level to another using a single drum or a plurality of drums as required, each having a self-supporting helical chain in accordance with the present invention.

The chain 10 need not be in engagement with the drums in the form of self-supporting helices, but may pass around the drums in a series of elongated loops, engaging half of each drum. In addition, the chain 10 may be formed into a single elongated loop.

The apparatus of FIGS. 4 and 5 is particularly useful for conveying and accumulating packages of cigarettes. In the packaging of cigarettes, cigarettes are enclosed in a cardboard package in any desired quantity, generally 10, 20 or 25 cigarettes to the package. The package then is passed directly from the packer to a wrapping stage where it is surrounded by a cellophane wrapper.

Apparatus employed in the wrapping stage generally is found to be somewhat inefficient and requires to be shut down from time to time to make adjustments, generally associated with the feed and the cutting of the cellophane.

When the wrapper is closed down it also is necessary to shut down the packer, otherwise packages of cigarettes will be formed which cannot be passed to the wrapper.

The necessity for shut down of the packer in addition to the wrapper results in a below capacity operation of the packer. In addition, shut down of the packer may result in hardening of the glue used to glue parts of the package together, and to apply regulatory stamp, if required. On restarting the packer, this may lead to the formation of unsatisfactory packages.

By the use of an accumulator intermediate the packer and the wrapper, the former may continue to operate during down-time of the latter. By operating the wrapper at a faster rate than the packer, the wrapper can wrap at least some of the accumulation of packages, which has taken place during one shut down, before the next shut down.

Cigarette packages are fed from a packer (not shown) onto the platforms of the chain 10 in the helix around drum 50. The chain 10 and the drums 50 and 52 are in motion. The packages are separated from each other on the chain by a certain distance. This distance is dependent on a number of factors, such as speed of rotation of the drums and rate of formation of cigarette packages.

The cigarette packages are conveyed on the chain 10 down the helix formed about drum 50, along the rectilinear portion joining the run-off point of drum 50 and the run-on point of drum 52 and up the helix formed about drum 52. The packages are discharged from the top of helix formed about drum 52 to a wrapper (not shown). This may be aided by providing a finger which projects from external of the system into channel 38.

During down-time of the wrapper, the lead package is prevented from passing to the wrapper by stop means. The packer and the conveyor 49, which now acts as an accumulator, continue to operate at the same rate. When the next package reaches the point of discharge from the top of the drum 52, it is prevented from so doing by the first package. Thus, as long as the wrapper is shut down and the packer and conveyor 49 continue to operate at the same rate, packages will continue to accumulate on the chain 10.

The drums 50 and 52 are surrounded by outer shields in this embodiment (not shown) located to prevent packages from becoming dislodged from the platforms during such accumulations. Such outer shields also may be necessary to prevent dislodgement of the packages due to centrifugal forces, if the chain is driven at a sufficiently high speed and the conveyor is not acting as an accumulator. Such shields may be removed and upwardly projecting flanges formed on the outer edges of the platforms may be provided to achieve the same effect. In addition, the platforms may be formed projecting upwardly from the horizontal and outwardly of the support portions. In this manner packages are urged inwardly.

Alternatively, the shields may be retained and the platforms formed projecting downwardly from the horizontal and outwardly of the support portions. In this way, an opening in the shields may be used to enable packages to be removed from the surface of the platforms.

When the wrapper starts running again, the accumulation of packages passes to the wrapper. Since the wrapper is run at a rate of wrapping which is faster than the rate of packaging, when the accumulation of packages is at least partially cleared before it is again necessary to shut down the wrapper.

The links of the chain 10 for this use should be constructed of material such that the cigarette packages may slide on the platforms when the wrapper is closed down and the chain continues to move passing underneath the stopped packages, but non-slipping enough so that packages while normally supported on the cantilevered platforms will not slip while the chain rises and falls through the helices.

The dimensions of the conveyor/accumulator 49, the rate of feed of packages and the linear speed of the chain 10 are calculated so that all the packages which may be accumulated during a shut down of wrapper of average duration can be accommodated. Only under exceptional circumstances will it become necessary to close down the whole packaging operation.

The leading and trailing edges of the platforms may be bevelled to aid in the smooth passage of the platforms below the stopped packages.

Modifications are possible within the scope of the present invention.

What we claim is:

1. A rigid link for a conveyor chain including a rigid platform adapted to support a load and first means located to and coextensive with one side of said platform having at least a part thereof extending from the plane of said platform, said first means having a shallow depth and being integral with said platform said first means including upper and lower parallel faces, said first means including holes extending therethrough substantially perpendicular to said parallel planes, the holes being adapted to receive therein pivot pins whereby said link may be pivotally connected to other links for pivotal movement of said link about an axis perpendicular to the parallel planes of said faces, a part of said first means disposed on the opposite side thereof from said platform includes protrusions projecting from said opposite side.

2. The link of claim 1 wherein said platform has leading and trailing edges, said leading edge being convex and said trailing edge being complimentarily concave.

3. A rigid link for a conveyor chain including a rigid platform adapted to support a load and first means located to and coextensive with one side of said platform having at least a part thereof extending from the plane of said platform, said first means having a shallow depth and being integral with said platform, said first means including upper and lower parallel faces, said first means including holes extending therethrough substantially perpendicular to said parallel planes, the holes being adapted to receive therein pivot pins whereby said link may be pivotally connected to other links for pivotal movement of said link about an axis perpendicular to the parallel planes of said faces, a part of said first means located on the opposite side thereof from said platform is curved to coact with a curved surface of a driving member.

4. The link of claim 1 wherein said first means is substantially perpendicular to the plane of said platform.

5. A conveyor chain including a plurality of articulated rigid links and capable of formation into a helix, each of said links consisting of a rigid platform adapted to support a load and a part integral with said platform located to and coextensive with one side of said platform, said part extending from the plane of said platform, said part having a shallow depth, the upper and lower extremities of said part being defined by upper and lower faces disposed in parallel planes, whereby when said chain is formed into a helix the upper face of said part of one link abuts the lower face of said part of the upper vertically adjacent link and the lower face of said part of said one link abuts the upper face of said part of the lower vertically adjacent link to space the platforms of vertically adjacent links apart from each other, and means pivotally connecting said link to other links for pivotal movement of said link about an axis substantially perpendicular to the parallel planes of said upper and lower faces.

6. The chain of claim 5 wherein said part includes a portion thereof disposed on the opposite side from said platform adapted to coact with means for driving the chain.

7. The chain of claim 5 wherein said part includes holes extending therethrough substantially perpendicular to said parallel planes of said faces and said means to pivotally connect are pins received in the holes.

8. A conveyor chain including a plurality of articulated rigid links and capable of formation into a helix, each of said links comprising a rigid platform adapted to support a load and first means located to and coextensive with one side of said platform having at least a part thereof extending from the plane of the platform, said first means having a shallow depth and being integral with said platform, said first means including upper and lower faces disposed in parallel planes, whereby when said chain is formed into a helix said first means of said link coacts with other like parts of vertically adjacent links of said chain to space the platforms of such links apart from each other, and means pivotally connecting said link to other links for pivotal movement of said link about an axis substantially perpendicular to the parallel planes of said upper and lower surfaces, said platform extending substantially perpendicular to the axis of said helix, said first means being substantially perpendicular to the plane of said platform, said platform having leading and trailing edges, said leading edge being convex and said trailing edge being complimentarily concave, said first means including protrusions projecting from the opposite side thereof from said platform and adapted to cooperate with protrusions on horizontally adjacent links to form a recess adapted to receive a movable member.

9. A conveyor chain including a plurality of articulated rigid links and capable of formation into a helix, each of said links comprising a rigid platform adapted to support a load and first means located to and coextensive with one side of said platform having at least a part extending from the plane of the platform, said first means having a shallow depth and being integral with said platform, said first means including upper and lower faces disposed in parallel planes, whereby when said chain is formed into a helix said first means of said link coacts with other like parts of vertically adjacent links of said chain to space the platform of such links apart from each other, and means pivotally connecting said link to other links for pivotal movement of said link about an axis substantially perpendicular to the parallel planes of said upper and lower surfaces, said platform extending substantially perpendicular to the axis of said helix, said first means being substantially perpendicular to the plane of said platform, said platform having leading and trailing edges, said leading edge being convex and said trailing edge being complimentarily concave, said first means being curved on the opposite side thereof from said platform to coact with a curved surface of a driving member.

* * * * *